(12) United States Patent
Miwa

(10) Patent No.: US 6,280,849 B1
(45) Date of Patent: Aug. 28, 2001

(54) GLASS ARTICLE HAVING SURFACE COATING OF BORIC ACID AND METHOD FOR PRODUCING THE SAME

(75) Inventor: Yoshiharu Miwa, Oumihachiman (JP)

(73) Assignee: Nippon Electric Glass Co. Ltd., Otsu (JP)

(*) Notice: Subject to any disclaimer, the term of this patent is extended or adjusted under 35 U.S.C. 154(b) by 0 days.

(21) Appl. No.: 09/254,233

(22) PCT Filed: Jul. 15, 1998

(86) PCT No.: PCT/JP98/03188

§ 371 Date: Mar. 2, 1999

§ 102(e) Date: Mar. 2, 1999

(87) PCT Pub. No.: WO99/03791

PCT Pub. Date: Jan. 28, 1999

(30) Foreign Application Priority Data

Jul. 16, 1997 (JP) .................................................. 9-208479

(51) Int. Cl.⁷ .............................. C03C 17/25; H02J 29/88
(52) U.S. Cl. .......................... 428/427; 428/426; 65/60.5; 65/60.51
(58) Field of Search ................... 65/60.5, 60.51; 428/426, 427

(56) References Cited

U.S. PATENT DOCUMENTS

| | | | |
|---|---|---|---|
| 2,324,601 | * | 7/1943 | Spanagel et al. . |
| 4,304,812 | * | 12/1981 | Perkins . |
| 5,962,565 | * | 10/1999 | Pagano . |
| 5,972,517 | * | 10/1999 | Kondo . |

FOREIGN PATENT DOCUMENTS

| | | |
|---|---|---|
| 661 817 | 11/1935 | (DE) . |
| 32 45 584 | 6/1984 | (DE) . |
| 441 603 | 1/1936 | (GB) . |
| 56 25970 | 3/1956 | (JP) . |
| 45 1193 | 1/1970 | (JP) . |
| 46 48061 | 2/1973 | (JP) . |
| 57 172 631 | 10/1982 | (JP) . |
| 2 120256 | 5/1990 | (JP) . |
| 3 44857 | 4/1991 | (JP) . |
| 4 11981 | 1/1992 | (JP) . |
| 6 340865 | 12/1994 | (JP) . |
| 7 10600 | 7/1995 | (JP) . |
| 08 283 042 | 10/1996 | (JP) . |

* cited by examiner

Primary Examiner—Deborah Jones
Assistant Examiner—Jason Savage
(74) Attorney, Agent, or Firm—Collard & Roe, P.C.

(57) ABSTRACT

Boric acid is used as a surface-protection coating for protecting a desired surface area of a glass article from weathering, contamination by dirt, dust, moisture and others, and streaks and/or cracks due to collision and friction with other objects. The boric acid coating is readily washed out by water upon actual use of the glass article.

11 Claims, 2 Drawing Sheets

GLASS ARTICLE HAVING SURFACE COATING OF BORIC ACID AND METHOD FOR PRODUCING THE SAME

TECHNICAL FIELD

This invention relates to a glass article having a surface-protection coating and a method for producing the glass article with the surface-protection coating, and, in particular, to material of the surface-protection coating.

BACKGROUND ART

During storage and handling operation of glass articles such as glass plates, glass bottle, glass tubes, glass bulbs and other glass products, glass surfaces are often contaminated by dust, dirt, moisture or others, cracked and/or streaked by touch or collision with any other objects, or weathered in long time. As a result, the glass articles have defects before use and cannot actually be used. For example, it is impossible to supply cracked or streaked glass plates in commerce for window glass plates. Contaminated glass bottles cannot be used for containers of drinks, foods and pharmaceuticals. Glass parts having those defects cannot be used at all in electric and electronic products such as cathode ray tubes (CRTs), liquid crystal displays (LCDs) or others.

Therefore, it is well known in the prior art to coat a glass surface of a glass article with a surface-protection coating. The coating is a layer or film of any substance for protecting the glass surface from streak and/or crack, weathering, and contamination by dirt, moisture and others during storage and handling operation. It is desired that the surface-protection coating can readily removed in practical use of the glass article.

Japanese patent publication No. 45-1193 (that is, No. 1193/1970, which will be referred to as Reference I) discloses a glass plate having a surface-protection coating which is soluble in water and, therefore, readily removed by water washing. The surface-protection coating is of ethylene-maleic acid copolymer with a bridged structure and is formed by applying a water solution of the copolymer onto a glass surface of the glass plate.

JP-A-46 48061 (Reference II) discloses to form a water-soluble thin coating of a nonionic surfactant on a glass surface of a glass bottle by spraying a water solution of polyoxyethylene alkyl phenol ether to the glass bottle.

JP-A-56 25970 (Reference III) discloses to form a water-soluble thin coating of silicate on a glass surface of a glass substrate by spraying a water solution of silicate to the glass substrate.

JP-A-4 11981 (Reference IV) discloses to form a thin coating of water-soluble plastic resin on a glass surface of a glass substrate by applying a water solution of plastic resin to the glass substrate. The water-soluble plastic resin is at least one selected from polyvinyl alcohol, carboxymethyl cellulose, hydroxypropyl cellulose, methyl cellulose, polyethylene oxide, polyvinylpyrrolidone, pyrrolidone vinyl acetate copolymer, methyl vinyl maleic acid copolymer, and acrylic acid-methacrylic acid ester copolyer.

JP-A-6 340865 (Reference V) discloses a glass substrate coated with a water-soluble salt such as sodium tripolyphosphate, sodium sesquicabonate, sodium hydrogencarbonate, sodium carbonate, sodium tetracarbonate, or potassium tetracarbonate.

JP-A-7 10600 (Reference VI) discloses a glass article such as glass bottle with a water-soluble coating such as phosphate, borate, silicate, sulfate, inorganic salt including sulfur, halide, carbonate, bicarbonate, nitrate, organic acid salt, double salt of those slats, organic acid, monosaccharides, and polysaccharides. Some of sodium salts are disclosed as the salts actually used.

As described above, it is known in the prior art that organic substances are used for water-soluble surface-protection coating of glass article. However, it is desired that organic substances are avoided from use for such coatings, because the organic substances may often cause the environmental pollution after being washed away by water.

The use of inorganic salts is also known in the prior art as disclosed in References III, V and VI. Among various inorganic salts, sodium salt is known superior in water solubility, and, therefore, useful for the water-soluble surface-protection coating. However, sodium ions in the coating unfortunately degrade the glass surface on which the coating is applied. The use of salts of other alkali metals has the similar problem.

On the other hand, JP-A-3 44857 (Reference VII) discloses a protective film or sheet attached by use of adhesive agent onto an outer face of a CRT tube for protecting a screen face. However, the adhesive agent used often contaminates the face and/or other area of the CRT. Further, there is a problem for wasting the protective sheet after being removed from the CRT.

It is also well known in the prior art to bring a glass article into contact with sulfuric acid gas or hydrochloric acid gas to form a protective layer. This is disclosed in, for example, JP-A-2 120256 (Reference VIII). The protective layer is a chemical compound of sodium in the glass with the gas. The protective layer can be washed out by water. However, since sulfuric acid gas or hydrochloric acid gas is used, there are problems in apparatus and safety.

DISCLOSURE OF INVENTION

Accordingly, it is an object of this invention to provide a glass with a water-soluble surface-protection coating which is neither of organic substance nor inorganic salt.

According to this invention, there is obtained a glass article having a water-soluble surface-protection coating, which is characterized in that the surface-protection coating is of boric acid.

The surface-protection coating is preferably a thin layer of 0.001–1000 $\mu$m, more preferably, 0.01–500 $\mu$m in thickness. When the surface-protection coating has a decreased thickness, it is difficult to protect the glass surface from streak or crack due to collision or friction with other objects. On the contrary, when it has an increased thickness, it takes excessive time for washing out the coating.

This invention further provides a method for producing a glass article having a water-soluble surface-protection coating on a glass surface thereof, characterized by steps of:
preparing the glass article having a glass surface while preparing a boric acid water solution;
applying the boric acid water solution onto the glass article to form a thin layer of the boric acid water solution on the glass surface; and
drying the thin layer of the boric acid water solution to form the water-soluble surface-protection coating of the boric acid on the glass surface.

Brushing or spraying can be used for applying the boric acid water solution onto the glass surface of the glass article. Alternatively, the glass article can be immersed into a bath contained with the boric acid water solution.

The boric acid is preferably orthoboric acid ($H_3BO_3$) in the view point of cost. However, metaboric acid ($HBO_2$) or tetraboric acid ($H_2B_4O_7$) can be used.

In applying the surface-protection coating, the water solution of orthoboric acid used may preferably consist of 0.01–3 wt % orthoboric acid and the balance of water. When a water solution containing orthoboric acid less than 0.01 wt % is used, it is difficult to obtain a coating having a desired surface protection. When a water solution containing orthoboric acid more than 3 wt % is used, the resultant coating is difficult to be washed out by water.

According to a preferable embodiment, the glass article is a glass funnel part for a cathode ray tube. The glass funnel part has an inner surface coated with the surface-protection coating of boric acid.

In another embodiment, the glass article is a glass panel part for a cathode ray tube. The glass panel part has an inner surface coated with the surface-protection coating of boric acid.

BEST MODE FOR CARRYING OUT THE INVENTION

The glass article according to this invention is coated with a surface-protection coating of boric acid which is water soluble. Therefore, the glass surface is protected from crack and/or streak by collision or friction with other objects, and from contamination by dirt, dust, moisture, and others. Since the surface-protection coating is of boric acid and is free from alkali elements, it does not degrade the glass surface coated by the coating.

Further, the boric acid coating is not so high in water solubility that it is resolved in dews deposited onto the coating. Therefore, the surface-protection coating is not damaged but can protect the glass surface during a long storage period of the glass article.

When the glass article is put into an actual use, the surface-protection coating can be readily washed out by water. Even if dirt, dust, moisture or others would have contaminated the surface-protection coating, they can be washed out together with the surface-protection coating.

It is desired that the washing is made in water flowing, preferably warm water of a temperature higher than 30° C. It is useful for removing the coating that the water contains surfactant.

Figure 1:
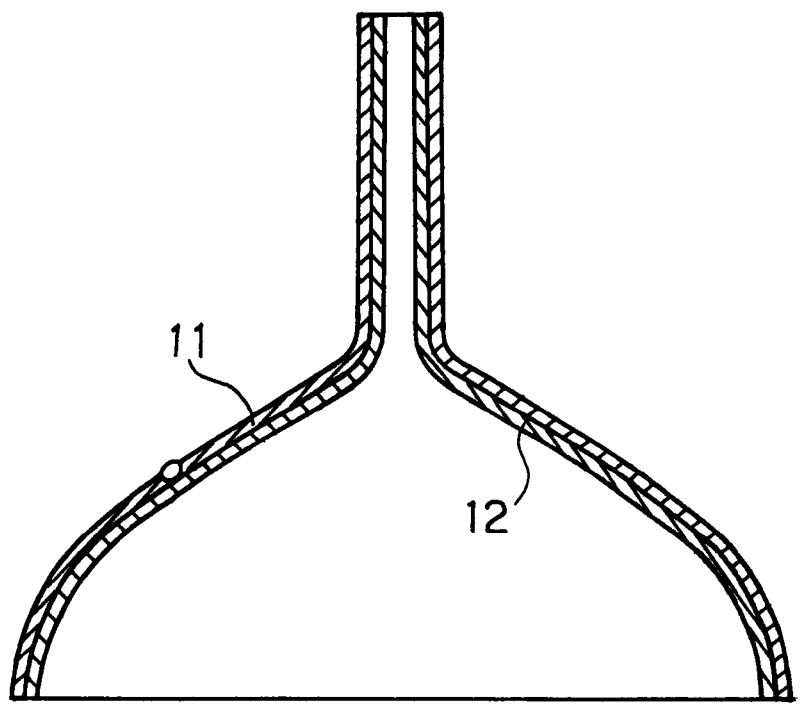
FIG. 1 is a sectional view of a glass funnel part according to an embodiment of this invention.

Referring to FIG. 1, a glass funnel 11 shown therein has a boric acid coating 12 on its inner surface. The glass funnel is a part of a glass bulb of a cathode ray tube (CRT). The boric acid coating 12 is a very thin layer relatively to the thickness of a glass wall of the funnel glass wall, for example, 0.01 μm but is shown with a thickness similar to that of the glass wall only for purpose of convenience of drawing.

In manufacturing the CRT, the boric acid coating 12 is washed out by water and a carbon layer is deposited on the inner surface of the glass funnel 11, before assembling into the CRT.

Figure 2:
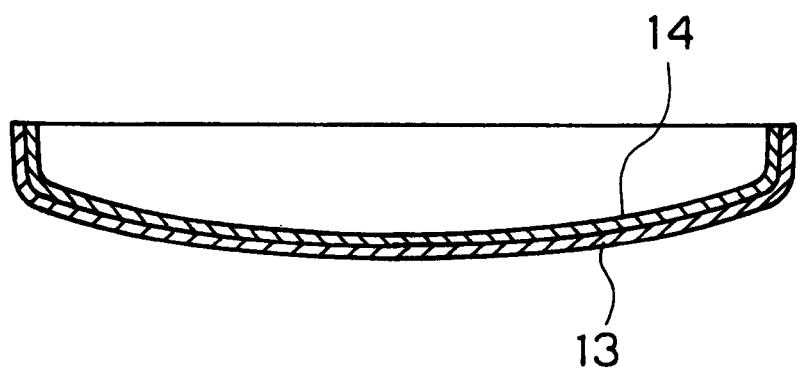
FIG. 2 is a sectional view of a glass panel part according to another embodiment of this invention.

Referring to FIG. 2, a glass panel 13 shown therein also has a boric acid coating 14 on its inner surface. The glass panel 13 is another part of the glass bulb of the CRT. As is known in the art, the glass panel 13 is combined with a glass funnel to form the glass bulb. The boric acid coating 14 is also very thin relatively to a glass wall of the panel glass wall, for example, 0.01 μm but is also shown with a thickness similar to that of the glass wall.

In manufacturing the CRT, the boric acid coating 14 is also washed out and a phosphor layer is deposited on the inner surface of the glass panel 13, before assembling into the CRT.

In the CRT, it is known in the art that the carbon layer and the phosphor layer without defects are very important for properties of the CRT. Therefore, it is essential for formation of excellent carbon layer and phosphor layer that the inner surfaces of the glass funnel and the glass panel are kept clean and flat with neither contamination nor streak. According to this invention, the inner surfaces are protected by the boric acid coatings and can be easily provided with cleanness and flatness by water-washing out of the coatings just before manufacturing CRT.

In the embodiments shown in FIGS. 1 and 2, the boric acid coatings 12 and 14 are only deposited onto the inner surfaces of the funnel 11 and the panel 13 on which the carbon layer and the phosphor layer are formed. However, it is needless to say that the entire surface of the funnel or the panel may be coated by the boric acid coating. When the boric acid coating is deposited on an outer face of a panel, it protects the face in place of the face protective sheet known in Reference VII.

Now, a method for forming the surface-protection coating of boric acid will be described below.

Figure 3:
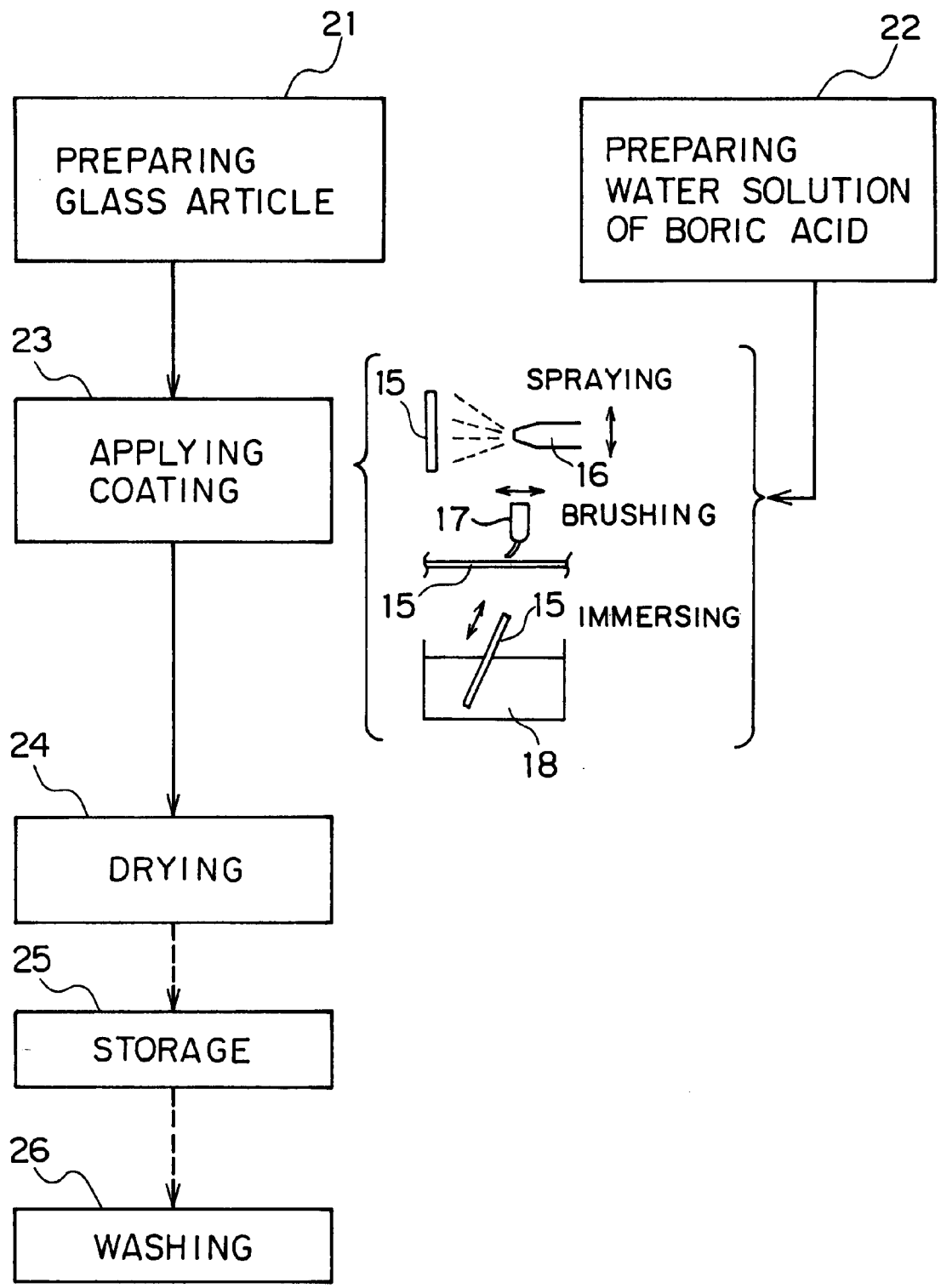
FIG. 3 is a flow illustrating processes for producing a glass article according to this invention.

Referring to FIG. 3, a glass article, for example, a glass plate for LCD is prepared at step 21, while a water solution of the boric acid, for example, orthoboric acid is also prepared at step 22. The water solution contains the orthoboric acid of 0.01–3 wt %.

Then, the boric acid water solution is applied onto the glass article at step 23 by spraying, bushing, or immersing. In detail, the water solution is sprayed on the glass article shown at 15 in the figure by use of a spray 16. In brushing, the water solution is coated onto the plate 15 by use of a coating brush 17. Alternatively, the glass plate 15 is immersed in a bath 18 contained with the water solution. The immersing is useful for applying the water solution onto the entire surface of the glass article. The brushing is desirable for applying the water solution onto a limited area of the glass surface.

Then, the glass article is left in room temperature or heated at a proper temperature at step 24 to dry the applied layer of the water solution. When the layer is dried to form a coating, the glass article with the surface-protection coating is completed.

When the completed glass article is then brought into actual use directly or after storage at step 25, the surface-protection coating is firstly washed out by water at step 26. As a result, the clean glass surface presents without any contamination and any streak or clack caused by collision and friction with other objects.

Now, description will be made as to experimental evaluation of the surface protection of the boric acid coating.

EXPERIMENT

A glass plate of CRT funnel glass was prepared with a size of 50 mm×50 mm×5 mm and then was cleansed and dried. Thereafter, a boric acid water solution containing 0.1 wt % orthoboric acid was sprayed by use of spray gun onto one surface of the glass plate. Thus, a boric acid coating was formed on the one surface of the glass plate after being dried. The coating was measured 0.02 µm in thickness.

Then, the glass plate with the boric acid coating was brought into a refrigerator and kept for 15 minutes in a cooled air at 5° C. Thereafter, the cooled glass plate was moved in air of 25° C. with a humidity of 60%, so that dews were present on the outer surface of the glass plate including the boric acid coating surface. After being dried, the glass plate was subjected to a surface observation under a microscope. As a result, no defect was found out in the boric acid coating.

After the boric acid coating was subjected to a one-sweep surface rubbing by a #1000 abrasive paper under a load of 40 gf, the glass plate was observed by a microscope. It was confirmed that the glass surface had no streak, although the boric acid coating was partially broken.

Then, the glass plate was cleansed for 30 minutes under a flow of pure water of 20° C. at a flow rate of 3 litters/minute and then brought under a microscope. It was observed that the boric acid coating was washed out completely.

COMPARATIVE EXPERIMENT

Tetraborate water solution containing 0.2 wt % sodium tetraborate was sprayed onto one surface of a cleansed and dried glass plate similar to the glass plate in the foregoing EXPERIMENT. After being dried, the glass plate was confirmed by a microscope to have a tetraborate coating of 0.05 µm thickness.

The glass plate with the tetraborate coating was subjected to dewing and drying in the similar manner in the foregoing EXPERIMENT, and then observed under a microscope. As a result, partial defects were found out in the tetraborate coating.

The EXPERIMENT and the COMPARATIVE EXPERIMENT show that the boric acid coating is superior to the borate coating as a surface-protection coating for glass article.

INDUSTRIAL APPLICABILITY

As described above, since the boric acid coating on a glass article has a sufficient surface protection property and can be readily washed out by water, it is possible to supply various glass articles reliably surface protected by the boric acid coating. Those articles can be brought into actual use with clean surfaces without streaks and cracks by water-washing out the coating. Therefore, this invention can be applied to various glass articles, especially, articles such as CRT glass funnels and panels, LCD glass plates which are required to have high quality surfaces exposed to treatments with high accuracy.

What is claimed is:

1. A glass article having a temporal surface-protection coating, said surface-protection coating being removed in use of the glass article, which is characterized in that said surface-protection coating is of water-soluble boric acid, said boric acid surface-protection coating being capable of being washed out from said glass article by water.

2. A glass article as claimed in claim 1, wherein said surface-protection coating is a thin layer of 0.001–1000 µm in thickness.

3. A glass article as claimed in claim 1, wherein said glass article is a glass funnel part for a cathode ray tube, said glass funnel part having an inner surface coated with said surface-protection coating of boric acid.

4. A glass article as claimed in claim 1, wherein said glass article is a glass panel part for a cathode ray tube, said glass panel part having an inner surface coated with said surface-protection coating of boric acid.

5. A method for producing a glass article having a temporal surface-protection coating on a glass surface thereof, characterized by steps of:

preparing the glass article having a glass surface while preparing a boric acid water solution;

applying said boric acid water solution onto said glass article to form a thin layer of said boric acid water solution on said glass surface; and drying said thin layer of said boric acid water solution to form a water-soluble surface-protection coating of the boric acid on said glass surface.

6. A method as claimed in claim 5, wherein said boric acid water solution is a water solution of orthoboric acid ($H_3BO_3$).

7. A method as claimed in claim 6, wherein said water solution of orthoboric acid consists of 0.01–3 wt % orthoboric acid and the balance of water.

8. A method as claimed in claim 5, wherein said surface-protection coating of said boric acid is 0.001–1000 µm in thickness.

9. A method as claimed in claim 5, wherein said boric acid water solution is applied onto said glass article by brushing.

10. A method as claimed in claim 5, wherein said boric acid water solution is applied onto said glass article by spraying.

11. A method as claimed in claim 5, wherein said boric acid water solution is applied onto said glass article by immersing said glass article in said boric acid water solution.

* * * * *